(No Model.)

J. R. MacLAUGHLAN.
SECONDARY BATTERY PLATE.

No. 455,968. Patented July 14, 1891.

Witnesses,
Hamilton D. Turner.
Murray C. Boyer

Inventor
John Rosborough MacLaughlan
by his Attorneys
Howson & Howson

UNITED STATES PATENT OFFICE.

JOHN ROSBOROUGH MacLAUGHLAN, OF PHILADELPHIA, PENNSYLVANIA, ASSIGNOR TO SIMON MILLER, OF SAME PLACE.

SECONDARY-BATTERY PLATE.

SPECIFICATION forming part of Letters Patent No. 455,968, dated July 14, 1891.

Application filed June 3, 1890. Serial No. 354,097. (No model.)

*To all whom it may concern:*

Be it known that I, JOHN ROSBOROUGH MACLAUGHLAN, a citizen of the United States, and a resident of Philadelphia, Pennsylvania, have invented certain Improvements in Secondary-Battery Plates, of which the following is a specification.

The object of my invention is to so construct a secondary or storage battery plate that the same will be practically indestructible and will be extremely light in weight, thus overcoming a serious objection to secondary or storage battery plates as at present constructed, which are made in large part of lead and are consequently extremely heavy.

Figure 1:
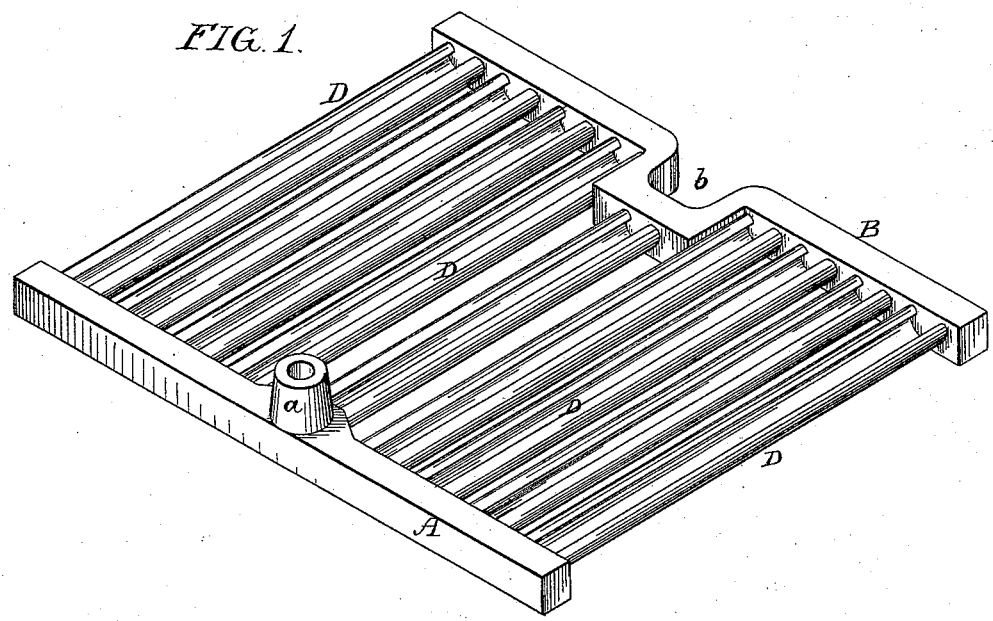
Figure 2:
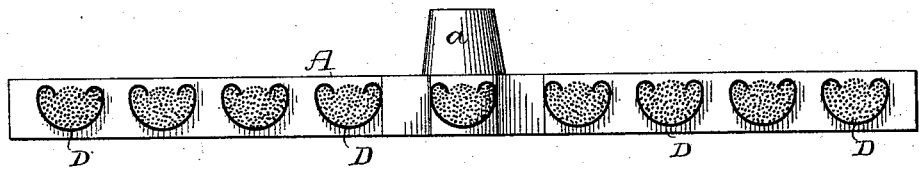
Figure 3:
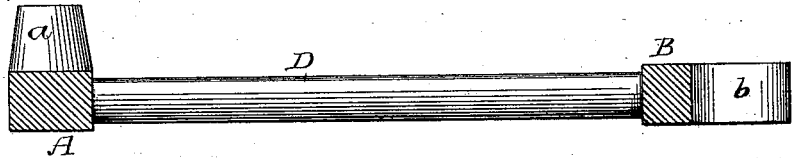

In the accompanying drawings, Figure 1 is a perspective view of a secondary or storage battery plate constructed in accordance with my invention, but without the active material therein. Fig. 2 is a transverse section of the plate, showing the active material applied thereto; and Fig. 3 is a longitudinal section of the plate.

The plate shown in the drawings consists of opposite end bars A B and connecting-bars D, the latter being in the form of troughs with inturned or hooked edges and having their ends embedded in the opposite end bars A B by casting or otherwise. The cross-bars D carry the active material of the plate, which is packed in said trough-like bars and is exposed on the top of each bar, displacement of the active material from the bars being prevented by the inturned or hooked edges of said bars, so that the active material is not likely to escape in quantity sufficient to accumulate between the bars and form a short circuit. One of the end bars of the plate has a projection a and the other bar has a recess b, and in assembling the plates that form the battery they are placed in reverse order, the plates being piled one above the other with suitable insulating material between the end bars, and the projection a on one plate occupying a position in the recess b of the plate above it, so that the positive plates may be connected on one side of the battery and the negative plates on the other side in the usual way.

Both the end bars and the connecting-bars of my improved battery-plate are composed of aluminium, for this metal may be effectually used for holding the active material of the plate without any interference with the proper electrical action of the battery, the metal, moreover, being practically indestructible under ordinary conditions of use and being extremely light, so that one of the main objections to storage-batteries having plates or grids of metallic lead is overcome.

I do not claim, broadly, a secondary-battery plate having a supporting plate or grid for the active material composed of aluminium; but

I claim as my invention and desire to secure by Letters Patent—

A secondary-battery plate composed of opposite end bars and transverse connecting-bars, all of aluminium, said connecting-bars being of hollow trough-like form with inturned edges and adapted for the reception of the active material, substantially as specified.

In testimony whereof I have signed my name to this specification in the presence of two subscribing witnesses.

JOHN ROSBOROUGH MACLAUGHLAN.

Witnesses:
EUGENE ELTERICH,
HARRY SMITH.